Feb. 26, 1957 F. M. CORRELL 2,783,119

AUTOGRAPHIC RECORDING APPARATUS

Filed July 26, 1955 5 Sheets-Sheet 1

Francis M. Correll
INVENTOR.

BY Clarence A. O'Brien
and Harvey B. Jacobson
Attorneys

Francis M. Correll
INVENTOR.

BY Clarence A. O'Brien
and Harvey B. Jacobson
Attorneys

AUTOGRAPHIC RECORDING APPARATUS

Filed July 26, 1955 5 Sheets-Sheet 3

Francis M. Correll
INVENTOR.

BY Clarence A. O'Brien
and Harvey B. Jacobson
Attorneys

AUTOGRAPHIC RECORDING APPARATUS

Filed July 26, 1955

5 Sheets-Sheet 4

Francis M. Correll
INVENTOR.

BY Clarence A. O'Brien
and Harvey B. Jacobson
Attorneys

Francis M. Correll
INVENTOR.
BY Clarence A. O'Brien
and Harvey B. Jacobson
Attorneys United States Patent Office 2,783,119

Patented Feb. 26, 1957

2,783,119

AUTOGRAPHIC RECORDING APPARATUS

Francis M. Correll, Milwaukee, Wis.

Application July 26, 1955, Serial No. 524,346

19 Claims. (Cl. 346—118)

This invention relates to autographic recording apparatus for recording the performance of a great variety of machines and it has for its principal object to provide a universally usable autographic recorder which permits to make a record of the performance of a machine during protracted periods of time, such as an entire workday, the machines operating with speeds ranging from extremely low to extremely high speeds of operation.

A further principal object of the invention consists in providing an autographic recording apparatus which is operable by rotational movements and reciprocating or other non-rotational movements the speed of which varies within wide limits.

A further object of the invention consists in providing an autographic recording apparatus the speed ratio of which is adjustable. This adjustable speed ratio being due to a combination of speed ratios each of which may be selected separately and independently and which may be applied conjointly.

A further object of the invention consists in providing indicating means which indicate the total speed ratio applied, notwithstanding that a separate adjustment of several speed transforming operations has been performed.

A further object of the invention consists in providing a recording apparatus which permits to obtain total counts for the entire operation performed at any moment during operation or at the end of the operation without special computator or counter. The record obtained by means of the recording apparatus also permits to see at any time whether the operation performed by the machine has reached the recording apparatus, is connected, is on schedule, or is behind the scheduled operation.

Further objects of the invention are related to the structure and can only be explained in connection with the detailed specification describing such structure.

The invention is illustrated in the accompanying drawings which form a part of the specification and which show one embodiment thereof.

It is however to be understood that the embodiment of the invention has been selected in order to explain the principle of the invention and the best mode of applying the principle. The invention may be clearly modified in order to be adapted for different purposes and it will therefore be clear to the expert in this field that a departure from the embodiment of the invention which has been illustrated in the drawings is not necessarily a departure from the principle of the invention.

The construction of the autographic recording device according to the invention is dominated by the problem to apply the recording apparatus to a wide variety of industrial operations so that it may as well be used in connection with the recording of the output of the number of pieces manufactured or by the movements made by any part of a machine or machine tool, or the number of revolutions per time unit by a revolving part of a machine such as a shaft.

Any mechanical machine operation involving moving parts whether reciprocating or oscillating at any frequency or rotating with any number of revolutions may be permanently recorded on a chart. Such a chart will moreover not only make a record of the time during which a machine or device is in operation but will also make a record of the idle time.

The recorder according to the invention therefore, is capable of recording the time during which a machine is running, the speed at which the machine is running, or the speed in miles per hour, or in other units in which some part of the machine is moving, for instance, the speed with which the machine reels or unreels material or the like. It may further make a record of the number of revolutions made by a rotating part of the machine, the number of oscillations or the number of reciprocations performed during a time unit.

The invention is illustrated in connection with a mechanically driven clock, but it will be clear that a synchronous motor driven at a speed depending on the frequency of the electric current and other time keeping devices may be used.

Figure 1:
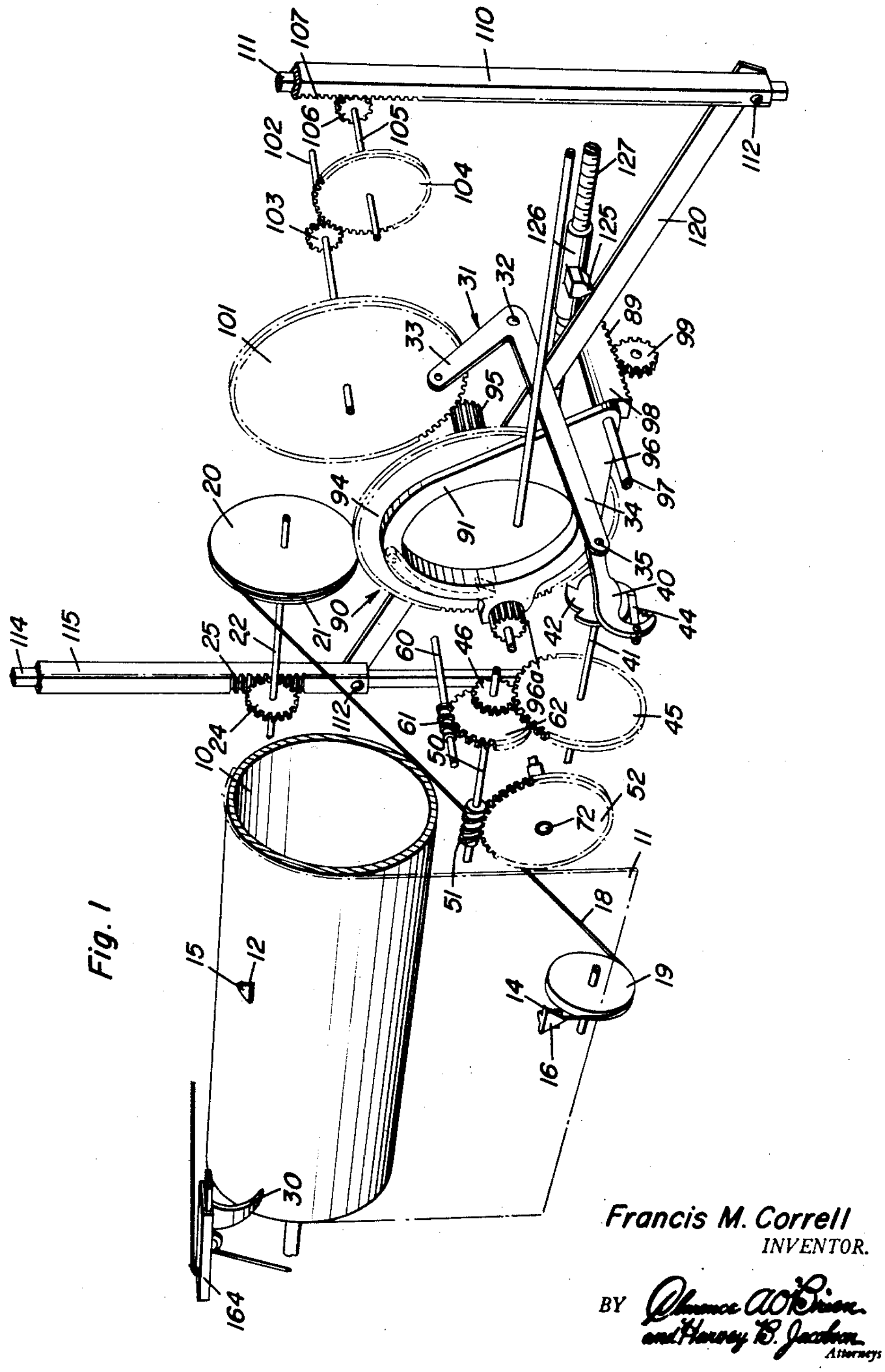
Figure 1 is a diagram shown in perspective illustrating the main parts of the invention but omitting a number of parts which have been illustrated separately.

The principle on which the machine operates is illustrated in Figure 1. For a better understanding of the design of the autographic recorder according to the invention it may be emphasized that the main problem arising in connection with the universally usable recorder consists in the extreme variability of the magnitude to be recorded by the device. If the device is not to be specialized for a specific recording job, such a recorder has, for instance, to make a record on a chart for a given period—say a period including whole working days from eight to twenty-four hours—while being driven at a rotational velocity which may range from velocities of .001 to speeds of the order of $10^4$ R. P. M. If the output has to be recorded, say in pieces, the count may vary between a few units per minute up to the order of several thousands per minute or per hour. To reconcile the extreme variability of the operational speed or movements to be recorded with a predetermined speed of advance produces a major problem which dominates the construction of the recorder.

Figure 10:
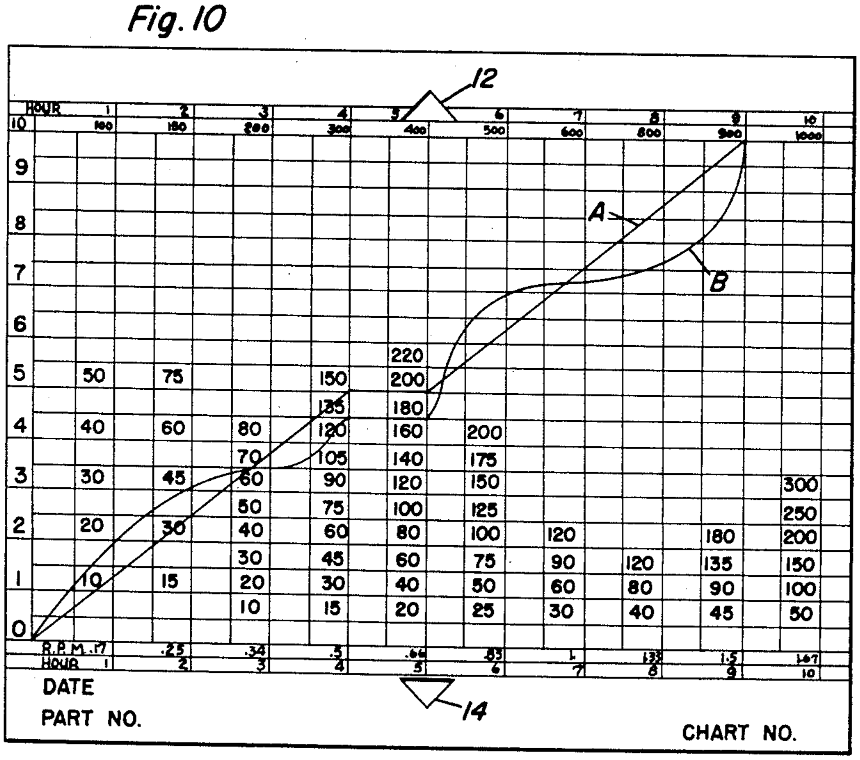
Figure 10 is a view of a chart such as produced by the autographic recorder according to the invention.

As will be seen in the diagram of Figure 1 the recorder according to the invention comprises a recorder drum 10 around which a paper or cardboard 11 is wound on the surface of which the recorded chart is produced. The chart carrying member 11 is indicated in Figure 1 in dots and dashes. The chart itself containing printing indication permitting to interpret the record made on the chart immediately is shown in Figure 10, this figure illustrating an example of a chart which is used for a machine the output of which counted.

The record which is drawn on the chart and the recorder will be explained below. It will be noted that the chart 11 is provided with two punched holes 12 and 14, one at the top and one at the bottom. One of these holes is caught by a lug 15 projecting from the circumference of the drum 10, while into the other a pulling head or lug 16 is inserted which is attached to the end of a rope, cord or cable 18 trained over a grooved pulley 19.

At the beginning of the operation the chart is wound on the drum the punched holes 12 and 14, shown as being triangular in the example illustrated, being engaged by the two lugs 15 and 16.

It will also be noted from Figure 1 that the end of the rope, cord or cable 18 is trained over and attached to another groved pulley 20, the point of attachment of the cord, rope or cable being shown at 21.

The pulley 20 is moved by means of a shaft 22 carrying a pinion 24 which pinion in its turn is driven by a rack 25 which is formed on the surface of a slide 115, which is described below.

While the movement of the pulley 20 is always the same and is performed during the period of time during which the chart takes the record, proportionality must be established between this movement and the output speed, or the movements of the machine the operation of which has to be recorded, the means for maintaining such proportionality being explained below.

From Figure 1 it will be further seen that a stylus 30, moving transversely and in substantial parallelism with the drum, draws a line across the chart at a rate which is constant and proportional to the time elapsed. Therefore, the stylus, as will be explained, is moved by a clockwork or other time keeping element at a strictly constant speed. The line drawn by the stylus on the chart which is moved at a variable speed proportional to the output speed, or general performance of the machine or apparatus under supervision thus contains an exact time related record of said output speed, or other performance for the period during which the chart is advanced, the output speed, etc. being clearly readable on the chart if the ordinates of the same are provided with suitable graduation marks, the abscissa of the chart being, of course, the time unit. Preferably, as shown in Figure 10, a plurality of graduations is provided along the chart (corresponding, for instance, to the number of pieces manufactured by a machine) among which the proper graduation corresponding to the adjustment which was made must be selected by the operator. In order to cover the whole range for which a recorder may be constructed it is, however, necessary to use a number of different cards, for instance 6–10 charts, among which the one used may be selected. The chart illustrated is therefore only one of this series, adapted for the special range of operation.

Referring again to the diagram shown in Figure 1, it will be seen that the way in which the machine or apparatus, the performance of which is to be recorded acts on the chart may somewhat differ according to the type of the apparatus or machine and the type of record desired. Essentially, however, in all machines two types of movements are performed; namely movements which are of a reciprocating or translatory type and rotating movements. Practially all movements made by machines or apparatus may be so transformed that one of these two types of movements is the result.

The recorder input mechanism may therefore consist either of a lever 31 which has the shape of a bellcrank lever fulcrumed at the pivot 32 or of a shaft which may be coupled with a rotating member of the machine. If the movement of the apparatus or machine to be supervised by a recorder is of the reciprocating or oscillating type it is transmitted to the arm 33 of the bell-crank lever 31. A swinging or reciprocating member of the machine or apparatus the performance of which is to be recorded is so placed that at each stroke it pulls or presses the arm 33, moving it clockwise.

Figure 4:
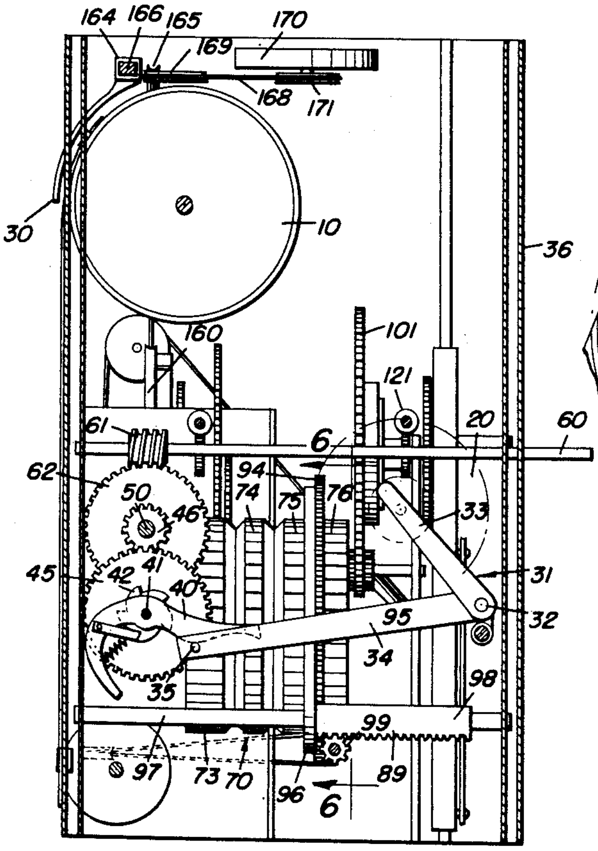
Figure 4 is an elevational side view partly in section, the section being taken along line 4—4 of Figure 2.
Figure 6:
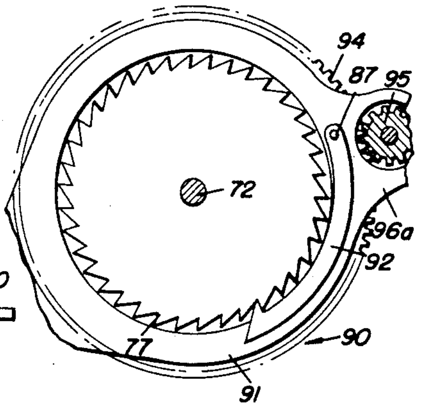
Figure 6 is an elevational side view of a detail.
Figure 7:
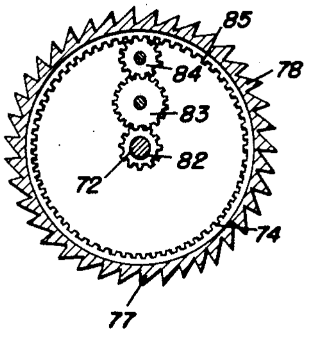
Figure 7 is a cross-sectional view through the mechanism illustrated in Figure 5 the section taken along line 7—7 of Figure 5.

This clockwise movement can also be seen in Figure 4 and it causes a swinging movement of the other arm 34 of the bell-crank lever 31 which is provided with a laterally projecting pin or trunnion 35 acting upon a pawl actuator 40 which may rock around a shaft 41 of a ratchet wheel 42. The pawl actuator 40 moves a pawl 44 which engages the teeth of the ratchet wheel 42 and upon each stroke of the pawl actuator 40 and bellcrank lever 31 the ratchet wheel is advanced over an angular distance corresponding to one tooth.

The angular movement of the ratchet wheel 42 is transmitted to the shaft 41 carrying the toothed wheel 45. The toothed wheel 45 in its turn transmits this movement to the pinion 46 mounted on shaft 50, and shaft 50 moves a worm 51 which turns a worm wheel 52.

Figure 3:
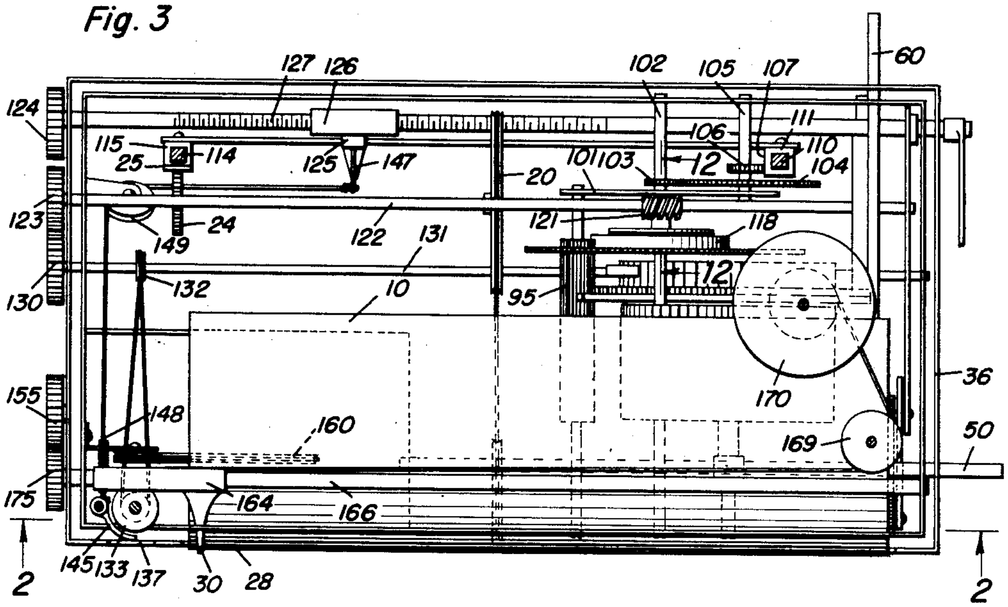
Figure 3 is a plan view of the autographic recorder according to the invention.

It will thus be seen that the worm wheel 52 which, as described below, drives a variable transmission means may be driven either by the bellcrank lever 31 through the members 35, 40, 44, 42, 45 and 46 as described or the shaft 50 may act as a drive shaft and may be so arranged that it projects outwardly as seen in Figure 3. This shaft then may be directly connected either by a flexible coupling to a part of the machine the performance of which has to be recorded or it may be coupled with this machine by means of a flexible shaft if the apparatus is at a distance. The shaft may also be driven by electric remote control for instance by a Selsyn or other self synchronizing motor which is driven by a transmitting unit coupled with the shaft of the machine or apparatus the performance of which has to be supervised.

In this way the recorder units may be arranged in a special supervising room and driven by remote control from the machines the performance of which is recorded.

Likewise other well known electrical transmission means may be used. The connection between the recorder and the machine is not shown as it clearly varies with the type of apparatus with which the recorder is connected and will be only effected with means well known in the art.

When the shaft 50 is driven by the machine the performance of which has to be recorded, the crank lever and ratchet wheel mechanism is idle. Conversely, when the bellcrank lever is operated the shaft 50 remains unconnected.

In order to further vary the speed with which the recording apparatus is driven already at the input, a further drive shaft 60 may be arranged, preferably at right angles to the drive shaft 50, driving a worm 61 which meshes with a gear 62 on shaft 50. This shaft is therefore mainly used in the event that the machine part to be coupled with the recorder is driven at high speed, and in this case it may be of advantage to drive shaft 60 with the high speed so that the shaft 50 and worm 51 and the worm wheel 52 are already operated with a speed which is reduced.

It will be understood that the two shafts 50 and 60 and their drive by means of lever 31 and ratchet mechanism 40, 42 will all be arranged on the recording unit but will be used only alternatively. These three means driving the recorder are used for varying recording operations and in order to enable each recorder to be driven by different production machines.

All these three driving means namely the shaft 50, the shaft 60 and the bellcrank lever 31 operating the ratchet mechanism 40, 42, and 41, drive the worm wheel 52 which transmits it movements ultimately to the means for drawing the chart along and for pulling it off the drum through a number of intermediate mechanisms permitting a very high variability of the transmission ratio.

These mechanisms are, however, only partly shown in Figure 1.

Referring now to Figures 2, 4, 5, 6 and 7 it will be seen that the mechanisms thus far described are housed in a casing 36 in such a manner that the shafts 50, 60 project outwardly so that they may be connected with a flexible shaft or flexible coupling in the manner above indicated, and likewise the arm 33 of the bellcrank lever 31 is arranged on the outside in order to be connected with and acted upon by one of the members of a production machine.

Figure 5:
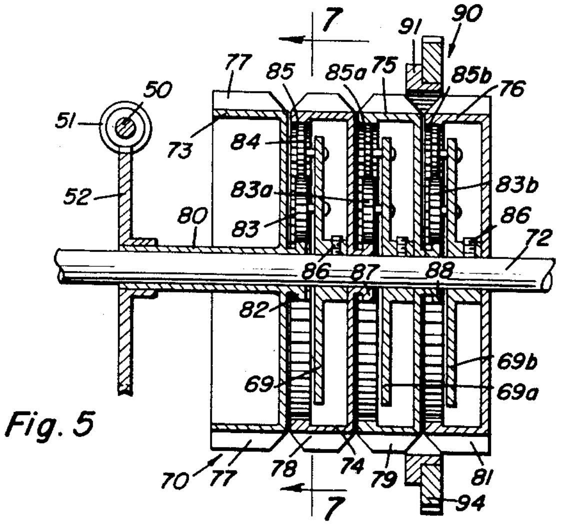
Figure 5 is an elevational sectional view through a portion of the apparatus the section following a plane through line 5—5 of Figure 2.

As seen in Figure 5 the worm wheel 52 driven by the worm 51 on shaft 50 is rotatably mounted on a fixed shaft 72 and transmits its motion by means of a variable gear transmission generally indicated at 70 in Figure 5 to a gear wheel 101 and a further variable transmission mechanism connected therewith and to be described later.

The shaft 72 supports a series of transmission drums 73, 74, 75, 76 each provided on its outside with ratchet teeth 77, 78, 79, 81, each of said drums, with the exception of the first drum 73, being driven by internal gear wheels. The first drum is integral with or fixedly connected to a sleeve 80 which is keyed or otherwise coupled to the worm wheel 52 driven by shaft 50 or by the ratchet mechanism 42 or by shaft 60. This sleeve 80 has a toothed projection 82 projecting into the interior of the next drum 74 the said projection forming a pinion which meshes with a pinion 83 mounted on a disk or arm 69 which in its turn is fixedly mounted on the stationary shaft 72 as indicated by the setscrew 86. The pinion 83 meshes with a further pinion 84 which, in its turn, engages internal gear teeth 85 provided along the inner surface of the drum 74. The drum 74 thus rotates with a speed which is a predetermined fraction of the speed with which the drum 73 rotates.

Exactly the same construction obtains also in connection with all the other drums 74, 75, 76. The drums 74 and 75 each has a sleeve projecting into the interior of the space surrounded by the adjacent drum and ending in a pinion indicated at 87, and 88, meshing with gear wheels 83*a* and 83*b* rotatably mounted on disks or arms 69*a*, 69*b* which gear wheels by means of intermediate pinions engage the internal teeth 85*a* and 85*b*, respectively, on the inside of the drums 75, 76 respectively. It will thus be clear that each drum will rotate with a reduced speed related to the speed of the preceding drum of the series by the same ratio. If the speed ratio between drums 73 and 74, for instance, is$1/n$ the same ratio will obtain between drums 74 and 75 and drums 75 and 76, so that the speed ratio between drums 73 and 75 is $1/n^2$, that between drums 73 and 76 is $1/n^3$ etc.

In order to take off the reduced speed, reduced according to the above explained ratio, all drums 73, 74, 75, 76 with ratchet teeth on their outside are of the same size and form a guide for the shiftable take-off assembly 90. This assembly includes an annular disk 91 with an inner cylindrical surface which is of such a diameter that it may slide along the ratchet teeth 77, 78, 79 and 81 of the drums. The assembly carries a toothed wheel disk 94 on which a ratchet pawl or dog member 92 is pivoted at 87. This dog member 92 engages the ratchet teeth 77, 78, 79, 81 of the various drums on which it is seated for the time being. The assembly may be moved for engagement with any one of the drums in a manner described below.

The toothed wheel 94 of the take-off assembly meshes with a pinion rod 95 which consists of a rod into which teeth have been milled axially of such a length that the toothed wheel 94, in every position into which it may be shifted, will always engage the pinion 95.

Figure 2:
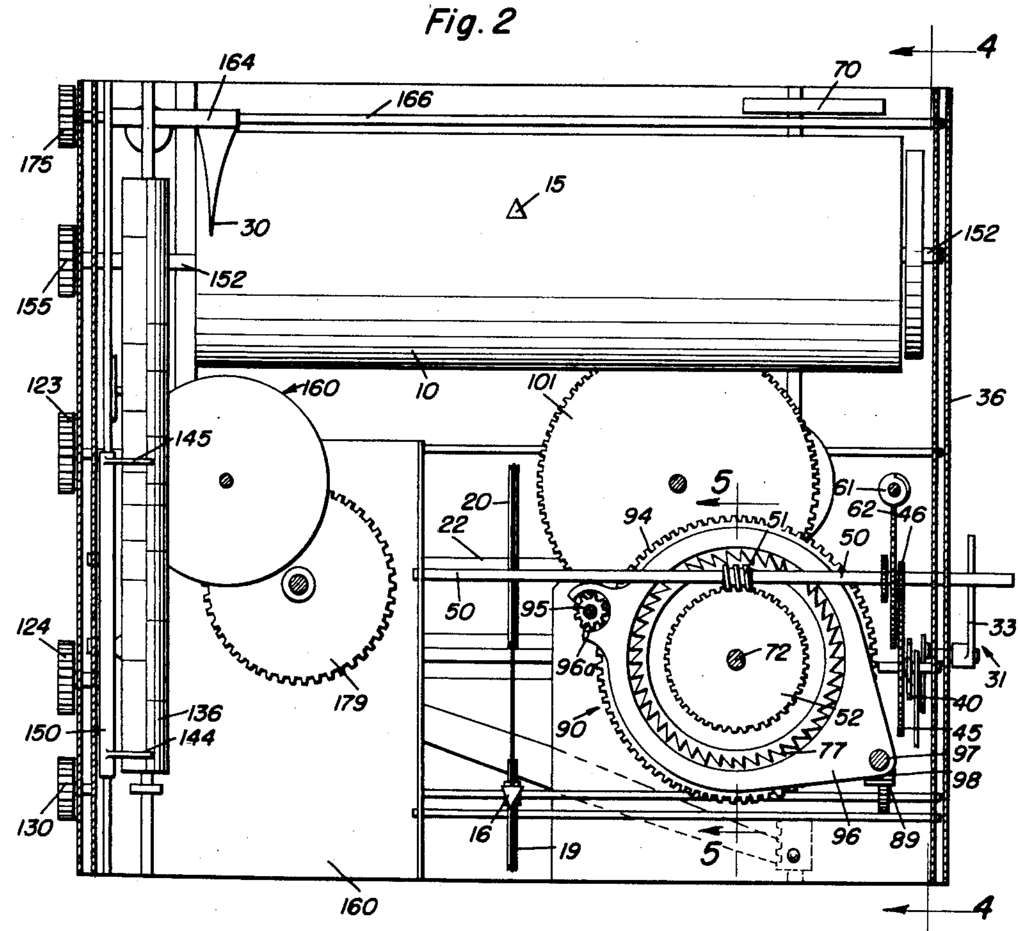
Figure 2 is an elevational side view of the apparatus partly in section, the section being taken along line 2—2 of Figure 3.

In Figure 1 indicating diagrammatically the principle and outlining the operation of the recorder according to the invention, the drums of the speed reducing transmission gear 70 have not been shown. However, the take-off assembly 90 is shown and it is seen that the disk 91 of this assembly is provided with suitable means for shifting the assembly 90 along the drums. These means are also shown in Figures 2 and 4.

The said means includes a substantially triangular extension 96 (see also Figure 9) with a guiding aperture through which a guiding rod 97 passes. Moreover this extension carries a member 98 provided with a rack 89 in meshing engagement with a pinion 99. The movement of the pinion therefore moves the rack 89 and the member 98 and thereby shifts the assembly 90 riding on the drums and brings it into the desired position. The assembly 90 may be supported in addition by the projecting supports 96*a* which partly surround it and may rest on the toothed pinion rod.

Figures 9, 13:
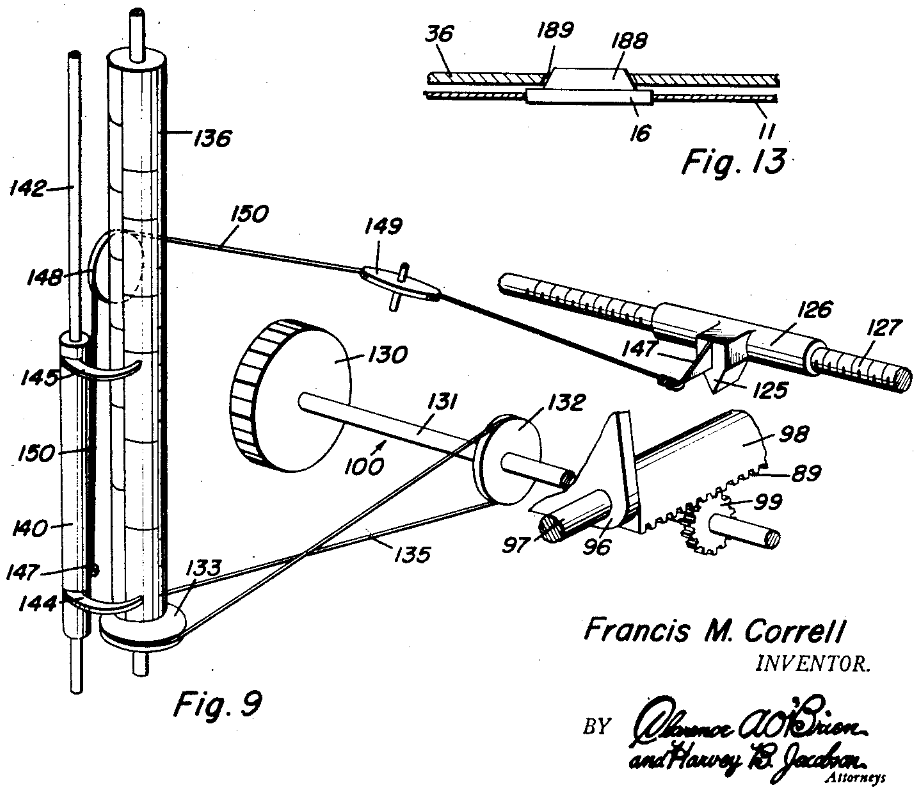
Figure 9 is a perspective diagrammatic view of the means for indicating the total speed ratio used within the apparatus.
Figure 13 is a sectional plan view of a detail showing the guiding of the pulling head of the chart.

The mechanism for shifting the assembly 90, generally indicated at 100 in Figure 9 is manually operated and consists of a shaft 131 carrying the pinion 99, the shaft being turned manually by means of a knob 130. While the manual shifting assembly is not shown in Figure 1, but may be seen in Figures 2 and 9, Figure 1 shows that during displacement of the take-off assembly 90 the toothed wheel 94 will remain in meshing engagement with the pinion rod 95. Further the pinion rod 95 extends to a point where it also will be in engagement with the toothed wheel 101 which is connected with shaft 102 by means of a gear mechanism 118 described below. The shaft 102 carries a pinion 103 meshing with toothed wheel 104 on shaft 105. The pinion 106 mounted on said shaft 105 engages a rack 107 of a slide 110 of the chart moving mechanism.

The slide may move up and down along guide posts 111 and it transmits its motion by means of a pivoted lever 120 with a shifting fulcrum to a similar slide 115 sliding along the guide posts 114. The pivot points of lever 120 on the slides 110 and 115 may be seen at 112.

The slide 115, likewise, is provided with a rack 25 which is a member driving the pinion 24 and the shaft 22 of the chart pulling mechanism consisting of pulleys 20 and 19, the pulling head 16 and the cord, rope or cable 18, which has been described above.

Figure 12:
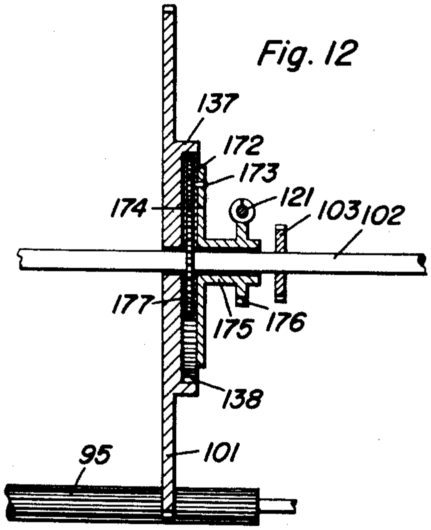
Figure 12 is a sectional elevational view of the slide mechanism which permits a manual return movement of the chart pulling mechanism.

The toothed wheel 101 is connected with the shaft 102 by means of an internal gear or planetary gear mechanism, shown in Figure 12. The toothed wheel 101 is provided with an annular laterally projecting rim member 137 provided with internal teeth 138. These internal teeth 138 mesh with a pinion 172 mounted on an axle 173 which is carried by a disk 174 projecting from a sleeve 175 loosely mounted on shaft 102. The sleeve also carries the worm wheel 176 which is engaged by worm 121.

The pinion 172 engages a pinion 177 which is keyed to or otherwise fixedly connected with the shaft 102. Normally the engagement between the internal teeth 138, the pinion 172 and the pinion 177 produces rotation of the shaft 102 when the toothed wheel 101 is driven, the worm wheel being held stationary by the worm. However, the mechanism also permits a return movement of the chart pulling mechanism when a new chart is inserted without moving toothed wheel 101. It is desirable that such a return movement should not react on all the members positively connected with the toothed wheel 101. The reversal of the chart pulling mechanism which brings them into their original position is produced manually by a screw or worm 121 (Figure 3) driven by a shaft 122 which may be turned by means of a knob 123 manipulated manually by an operator. When knob 123 is turned the two slides 110 and 115 return to their original position thereby also returning the pulley 20 into a position in which a new chart may be coupled with the chart pulling mechanism by means of the head 16. During such movement the sleeve 175 is rotated by worm wheel 176, and the pinion 172 rotates pinion 177 on shaft 102 while the wheel 101 remains stationary.

It has been mentioned above that the transmission of motion from slide 110 to slide 115 which carries the rack 25 occurs by means of a fulcrumed lever 120 pivoted at 112 to the two slides whose fulcrum is shiftable. The shifting of the fulcrum of lever 120 permits a gradual variation of the transmission ratio without varying the extent of the angular motion performed by pulley 20. The movement performed by the slide, 115, the rack 25, the pinion 24, and the pulleys 20 and 19 is always the same while the number of revolutions made by pinion rod 95 and toothed wheel 101 as well as the number of turns made by toothed wheels 103, 104 and 106 varies. This variation is due to the fact that the number of turns made by wheels 103, 104, 106 is proportional to the number of revolutions performed by one of the shafts 50 or 60 or to the number of strokes performed by lever 31 and to the position of the shiftable take-off assembly 90 of the reduction gear 70. It will be clear that an unlimited number of further variations of the ratio may be introduced by adjusting the fulcrum of the lever 120, thus making the recording instrument suitable for all kinds of production machines and other apparatus and for all speeds with which such machines may operate or at which they will deliver their output.

As seen in Figures 1 and 9, the fulcrum of the lever 120 is formed by a triangular knife blade 125 bearing on lever 120 and mounted on a threaded sleeve 126 which engages the threads of a spindle 127 extending across the slide arrangement 110—115 in the plane of lever 120. The threaded sleeve 126 may be moved to any position between the two slides 110 and 115 and the ratio of the lever arms with which motion is transmitted between the slides 110 and 115 may thus be changed gradually over an extremely wide range.

The change of position of the fulcrum 125 is obtained by means of the spindle 127 which is turned manually by means of the knob 124, said spindle moving the threaded sleeve 126 in the one or other direction according to the direction of rotation which is imparted to the knob.

Figure 11:
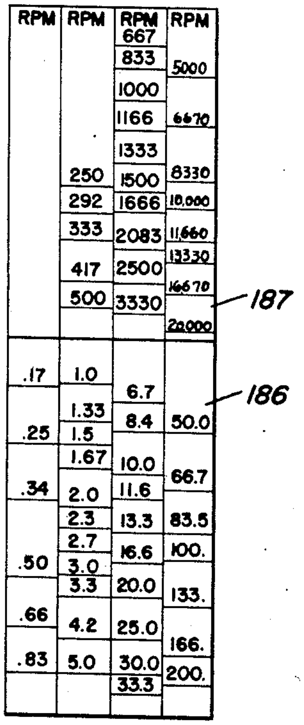
Figure 11 is a view of developed graduation charts used in connection with the indicator.

The position of the manually adjusted members must however be clearly indicated to the operator. To indicate the position of the assembly 90 of the speed changing mechanism 70 relatively to the drums the manual operating mechanism 100 for the pinion 99 which moves the assembly by means of the rack 89 includes a pulley 132 mounted on the shaft 131 and rotated with said shaft which, by means of a cord, cable or wire 135 drives a second pulley 133 preferably arranged in a plane at right angles to that of pulley 132. This pulley is mounted on a cylinder 136 which carries a graduation chart containing series of graduations arranged axially along the cylinder (Figure 11).

These graduations may be read through a window 137 in the casing 36.

The circumferential graduation of the cylinder obviously would only provide an indication of the transmission ratio to the gear assembly 70. However, as the total transmission ratio depends not only on the speed reduction in the reduction gear assembly 70 but also on the ratio of the lever arms of the lever 120 which transmit motion from the slide 110 to the slide 115, which ratio on the lever arms depends on the position of the fulcrum 125 it is also necessary to have an indicator for the position of the said fulcrum. It is of advantage to so arrange the indicator that it gives directly the total transmission ratio combining the two variable transmission ratios automatically. The total transmission ratio, as will be clear, is a product of the gear reduction maintained at the time being in the reduction gear assembly 70 with the transmission ratio obtained by the movement of the fulcrum 125. Graduation scales 186, 187 on which the speed ratio obtained may be indicated are illustrated in Figure 11. The graduation scale 186, for instance, may be that used in connection with high speed shaft 60. Other graduation scales may be used for other speeds, and are fixed on cylinder 136 in accordance with the type of machine with which the recorder is coupled.

In order to indicate the position of the fulcrum or the speed ratio corresponding to this position a slide member 140 is arranged which is slidably mounted on a guide rod 142 which is parallel to the axis of the cylinder 136 and which is arranged in proximity thereof. This cylinder 140 is provided with a plurality of arms 144, 145 which project from the slidable sleeve 140 with their ends sliding over the graduations of the cylinder 136.

The different arms 144, 145 and if necessary some further arms will preferably be so arranged that they may be used for indicating the speed ratio on the graduation scale when different input means, such as the shaft 50 or 60 or the lever 31, are used to operate the apparatus. They may also be so arranged that they indicate speed limits.

The sliding sleeve 140 is attached, at 147 to one end of a cord or cable 150 which runs over the pulleys 148 and 149 and is attached at its other end to the end of a nosepiece 147 projecting from the knife blade 125 which forms the fulcrum of the lever 120. The position of the sliding sleeve 140 thus indicates clearly the position of the fulcrum 125. As the cylinder 136 which carries the graduations is rotatable the combined device consisting of a cylinder 136 and the sliding sleeve 140 with its arms 144 and 145 form a multiplying device if properly graduated. The angular displacement of the cylinder 136 brings one of the columns containing one multiplication factor into operative or display position along which column the points 144, 145 slide. The position of the said arms is proportional to the other multiplication factor and the arms thus point directly to the product of the two factors or to the total ratio of transmission.

As has been explained above, the record made on the chart recording the performance of an industrial machine or a part thereof is produced by winding the chart around the drum 10 attaching it at one end to the drum by pushing the triangular perforations at one end over the triangular lug on the cylinder and pushing the triangular hole at the other end of the chart over the pulling down head or lug 16. This latter lug is provided with a guide piece 188 with beveled edges, guided within a slot 189 of the casing 36. It is attached to the cord, cable or wire 18; when the latter is pulled down, the chart is pulled from the drum at a given speed which is proportional to the machine speed or to the output of the machine in pieces or in other units. Simultaneously the stylus is moved axially along the drum at a constant speed which is proportional to the time during which the machine is in operation. The drum 10 is therefore only driven by the chart carrying web 11 itself and the drum merely turns on its axles. Either a spring or a frictional resistance is preferably introduced in order to avoid undesired movements of the drum. The chart is preferably made of cardboard or paper and it may be held in its proper position on the drum, for instance, by indentations or grooves in the charts entering corresponding grooves or projections provided in or on the drum (not shown). In addition the chart is also held by the triangular lugs or heads 15, 16 entering punched holes corresponding in size exactly to the size of the said heads or lugs. In the starting position therefore the chart must be laid around the drum. This is performed manually by means of the knob 155 which is turned by the operator, thus bringing first the projecting triangular lug on the cylindrical surface of the drum into the proper position for inserting it into the punched hole of the chart, whereupon the knob is further turned in order to wind the chart on the drum. After the chart has been wound around the drum cylinder the punched hole at the other end of the chart is engaged by the pulling lug 16 and the apparatus is now ready for operation.

Figure 8:
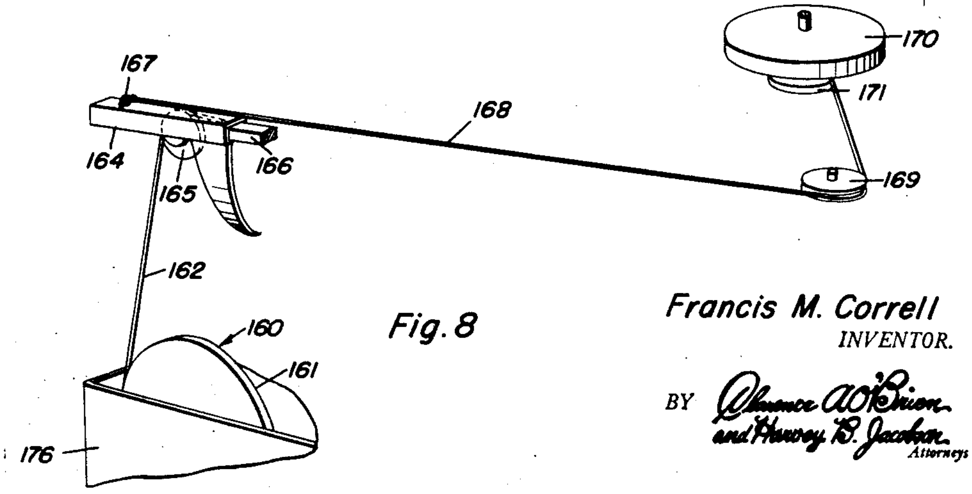
Figure 8 is a perspective diagrammatic view of the means for moving a stylus along the chart carrying drum of the apparatus.

The stylus 30 is of the conventional type and need not be described in detail. It is moved by a conventional clock mechanism 160 and, by means of a number of toothed wheels indicated at 179, drives a drum 161 which winds the cord, cable or wire 162 attached to a slide 164 (Figure 8). Preferably the cord, cable or wire 162 runs over a grooved pulley 165 in order to produce a longitudinal pulling action of the slide which is substantially coincident with the movement of the slide whatever the position of the slide 164.

The slide is moved along a guide rod 166, Figures 2 and 4, which runs transversely through the casing and which is parallel to the axis of the drum 10 and is arranged in the vicinity of the drum above the same.

The stylus slide 164 is moreover attached, at 167 to a second cable, wire or cord 168 which, after passing a guiding pulley 169, is attached to a drum 171 moved by a coil spring device 170.

The coil spring device draws the slide 164 along the guide rod to the extent to which the clock mechanism 160 permits such movement paying out the cord 162.

To wind the clockwork 160 and the coil spring mechanism 170 the clockwork may be connected in the well known manner to a ratchet winding mechanism with internal gears operated by means of a knob 175. The winding of the clockwork mechanism winds the cable 162 and therefore automatically brings the stylus back into its starting position. This movement also automatically winds the coil spring mechanism 170.

*Operation*

To describe the operation let it be assumed that the output of a machine producing a number of pieces should be recorded on the chart. In this case a chart may be used such as shown in Figure 10 in which the ordinate corresponds to the number of pieces. The chart may contain a plurality of graduations valid for the production of 100 to 1000 pieces, for instance, and the proper chart and graduation must be selected in accordance with the prevailing circumstances. For instance, if the machine, the performance of which has to be recorded, has an output of 400 pieces the chart must be read using this graduation scale. The abscissa on the chart contains the hours during which the production machine is worked. The chart, as shown in Figure 10, is made up for a whole working day of say ten hours, but may, of course, also be made up for twenty-four hours or for any other shorter or longer period.

A line A may be drawn on the chart before inserting it showing the desired operation. This line will of course be drawn using the graduation which corresponds to the expected production.

This chart with the graduation on it is put on the drum in the manner above already described by pushing the punched hole 12 over the lug 15 projecting from the drum and turning the knob 155 thereby winding the chart over the drum. When the end of the chart is in front and has reached its proper position the punched hole 14 is pushed over the pulling lug 16.

Further the output lever or any other member operated by the production machine when a piece has been finished is connected or brought into contact with lever arm 33 or lever 31 or, if desired, one of the driven shafts of the machine may be coupled with one of the two shafts 59 or 60 by means of a flexible shaft or a flexible coupling.

The operator then adjusts the transmission ratio by operating the knobs 130 and 124. The average speed of the machine is of course known. The transmission which is used must be determined accordingly. By adjusting the knobs 130 and 124 a computed speed ratio may be obtained. It may be directly read on the cylinder 136 if the cylinder is properly graduated by observing the position of one of the arms on the graduation scales of the cylinder 136.

If, when the operation starts, the slides 110 and 115 and the pulley 20 do not happen to be in their correct position the knob 123 is operated to bring the pulley and the pulling lug into their starting position.

The clock is then wound up by means of knob 175 and the recording apparatus is now ready for operation.

The operation itself has already been described in conjunction with the description of the parts. During the operation the chart is pulled downwardly in proportion with the transmission ratio which has been adjusted by the operator while the stylus 30 slowly inscribes a line on the chart which corresponds to the constant and uniform movement of the stylus. Across the drum 10 line B will be drawn which shows how the machine actually operated. In the example shown in Figure 11 it will be seen that production sometimes is higher and sometimes is lower than that which corresponds to the normal production expected. The interpretation of the chart of course depends on the existing conditions. When interpreting the chart, of course, the same graduation has to be used which was used when the curve for the expected production was drawn by the operator.

The chart may of course also record revolutions or any other result or magnitude to be investigated. It automatically makes a record of any stoppage.

It will be clear to the expert skilled in this art that many modifications of the apparatus above described may be made without in any way departing from the essence of the invention as described in the annexed claims.

What is claimed as new is as follows:

1. An autographic recording apparatus for recording the performance of mechanisms and machines, comprising a recording drum, a scriber arm moved axially along said drum and driven at a constant speed, a timed control mechanism for moving said scriber arm, a recording chart wound around the recording drum removably attached at one end to the recording drum and at the other end to a chart pulling mechanism, pulling a predetermined length of the chart off the drum, thereby unwinding the chart and rotating the recording drum, alternatively used means moved by the mechanisms or machine the performance of which is recorded, the alternatively used means including a rotatable member common to all alternatively used means and driven by a plurality of further rotating means connected with said common rotatable member by speed change gears with different speed transmission ratios and further driven by a reciprocable member, combined with a ratchet mechanism, driving the said common rotatable member with a speed proportional to the frequency of the reciprocation of said reciprocable member, means for connecting the chart pulling mechanism with the said common rotatable member, said last named means including a plurality of independent speed ratio changing mechanisms cooperating with each other to obtain a combined speed ratio change equal to the product of the speed ratio changes obtained by the aforesaid speed ratio change mechanisms, means for adjusting the speed ratio change of each speed ratio change mechanism, so as to drive said chart pulling mechanism unwinding the chart with a speed which adjusts the distance through which the chart is pulled within the time during which the scriber arm moves across the drum.

2. An autographic recording apparatus as claimed in claim 1, wherein the means for connecting the common rotatable member with the chart pulling mechanism include a plurality of speed changing gear mechanisms arranged in series and aligned with each other, and a shiftable member coupled with the chart pulling mechanism, means for shifting said shiftable member along the series of speed changing gear mechanisms for coupling it with any one of said speed changing gear mechanisms arranged in series to produce a preselected change of the speed of transmission of motion between the common rotatable member and the chart pulling mechanism.

3. An autographic recording apparatus as claimed in claim 2, wherein each speed changing mechanism includes a rotatable drum provided with a pinion, arranged within the interior of the next drum of the series, the drums the interior of which a pinion connected with the preceding drum in the series is arranged being provided with internal gear teeth, and means for driving each drum by means of said pinion coupled with the preceding drum within the series and by means of the said internal gear teeth of the drum.

4. An autographic recorder as claimed in claim 2, wherein each of said plurality of speed changing mechanisms includes a rotatable drum, provided with a pinion arranged within the interior of the next drum of the series, the drums in the interior of which a pinion connected with the preceding drum is arranged being provided with internal gear teeth, fixed members carrying gears within each of the last named drums, said gears meshing with the said pinions connected with the preceding drums of the series and with the internal gear teeth of the drums.

5. An autographic recorder as claimed in claim 2, wherein each of said plurality of speed changing mechanisms includes a rotatable drum, provided with a pinion arranged within the interior of the next drum of the series, the drums in the interior of which a pinion connected with the preceding drum is arranged being provided with internal gear teeth, all drums being of the same diameter and carrying ratchet teeth on their peripheral portion, said shiftable member encircling the drums and sliding along the ratchet teeth carrying the periphery of the drum, said shiftable member also carrying a pawl member engaging the ratchet teeth of said drum to which it has been shifted.

6. An autographic recording apparatus as claimed in claim 2, wherein the member shifted along the speed changing gear mechanism includes a toothed wheel engaging a pinion rod with teeth axially extending along its entire length, said length exceeding the axial length of all of the drums arranged in series.

7. An autographic recording apparatus as claimed in claim 2, wherein the member shifted along the speed changing gear mechanism includes a toothed wheel engaging a pinion rod with teeth axially extended along its entire length, a manually operated means for shifting said shiftable member.

8. An autographic recording apparatus as claimed in claim 2, wherein the member shifted along the speed changing gear mechanism includes a toothed wheel engaging a pinion rod with teeth axially extending along its entire length, said member shifted along the speed changing gear mechanisms being further provided with an extension having a guiding opening, a guiding bar passing through said guiding opening, a manually operated shifting means for shifting said last named member along the guide bar and along the speed changing gear mechanisms to select the desired speed at which the chart pulling mechanism will be driven.

9. An autographic recording apparatus as claimed in claim 2, wherein the member shifted along the speed changing gear mechanism includes a toothed wheel engaging pinion rod with teeth axially extending along its entire length, said member shifted along the speed changing gear mechanisms being further provided with an extension having a guiding opening, a guiding bar passing through said guiding opening, a rack attached to said last named member, a pinion meshing with said rack and a manually operated shaft for rotating the pinion and for advancing said last named member shiftable along the speed changing gear mechanisms to the position in which it may be coupled with a desired speed change gear mechanism.

10. An autographic recording apparatus as claimed in claim 2, wherein the pulling mechanism of the chart is provided with a pulling head engaging a hole punched at one end of the chart into the same, the chart being also provided with a second punched hole at its other end engaged by a lug projecting from said drum.

11. An autographic recording apparatus as claimed in claim 2, wherein the pulling mechanism of the chart is provided with a pulling head engaging a hole punched at one end of the chart into the same, said pulling head being attached to a pulley engaging a transmission member adapted to be reeled on and unreeled from a pulley to which said transmission member is attached, said pulley when rotating through a predetermined angle reeling the transmission member, thereby pulling the pulling head towards it so as to pull the chart off the drum, a first slide member guided along a slide post, means connected with the slide member for moving said pulley, a second slide member moving along and guided by a guide post, a member transmitting the reciprocating movement of the said second slide member to the first slide member, the last named slide member being moved in proportion to the movement imparted to the second slide member, and means for driving the said second slide member by the speed ratio mechanism producing a step by step speed ratio change.

12. An autographic recording apparatus as claimed in claim 11, wherein the member transmitting motion from the second slide member to the first slide member consists of a two armed lever with a shiftable fulcrum, pivoted to the said first and second slide members.

13. An autographic recording apparatus as claimed in claim 11, wherein the member transmitting motion from the second slide member to the first slide member consists of a two armed lever with a shiftable fulcrum, pivoted to the said first and second slide members, a member transversely shiftable betwen the slide members provided with a knife blade acting as a fulcrum, and means for moving the transversely shiftable member between the slide members.

14. An autographic recording apparatus as claimed in claim 11, wherein the member transmitting motion from the second slide member to the first slide member consists of a two armed lever with a shiftable fulcrum, pivoted to the said first and second slide members, a member transversely shiftable between the slide members provided with a knife blade acting as a fulcrum, and means for moving the transversely shiftable member between the slide members, a threaded sleeve carrying said knife blade, a threaded spindle engaging the threaded sleeve and manually operable means for rotating said spindle.

15. An autographic recording apparatus as claimed in claim 2, wherein means are provided for shifting the shiftable member along the speed ratio changing gear mechanism, comprising in addition an indicator mechanism, indicating the ratio of transmission of movement between the mechanism or machine the performance of which is recorded and the chart pulling mechanism, the said indicating mechanism including means operated by the means for shifting the shiftable member along the speed ratio changing gear mechanism for rotating an indicator chart provided with a plurality of graduations mounted on the indicator chart carrying cylinder, each graduation indicating the speed ratio change obtained by shifting the aforesaid shiftable member.

16. An autographic recording apparatus for recording the performance of production machines, comprising a recording drum, a scriber arm moved axially along said drum, driven at a constant speed, a time controlled mechanism moving said scriber arm, a recording chart mounted around the recording drum, removably attached at one end to the said recording drum, and at the other end to a chart pulling mechanism, pulling a predetermined length of the chart off the drum, thereby unwinding the chart and rotating the drum, means for connecting the chart pulling mechanism with the production machine the performance of which is to be recorded, means for varying the speed with which the chart is pulled, said means including a series of coaxial aligned drums arranged in a series, each of the drums driving the next drum of the series by means of a speed changing gear transmission, a shiftable member sliding along said series of drums, means for coupling the shiftable member with any one of the aligned drums arranged in a series, means for shifting the shiftable member along the series of drums, said last named means including a rack attached to said shiftable member, a pinion engaging the rack and moving the same, and a shaft provided with a knob for manually rotating the pinion, a toothed wheel carried by the shiftable member, a pinion rod in engagement with said toothed wheel, a further toothed wheel gear transmission in engagement with said pinion rod, including a further, rack engaging pinion, said last named rack engaging pinion driving a rack carried by a first slide member sliding on a slide post, a second slide member sliding on a slide post, spaced from the said first slide member and provided with a rack, a transmission lever pivoted to said two sliding members and adapted to rock around a fulcrum disposed between the slide members thus transmitting motion from the first slide member to the second slide member, means for shifting the fulcrum between the said slide members, said means including a sleeve carrying a knife blade acting as the fulcrum, means for shifting said sleeve manually to vary the ratio of transmission between the two slide members, the said second slide member, pivoted to the transmission lever, driving, by means of its rack engaging a pinion, a pulley, the latter forming part of the chart pulling mechanism, said chart pulling mechanism further including a reelable transmission member fixed to the said pulley at one end and carrying the pulley head, said pulley head being attachable to one end of the chart.

17. An autographic recording apparatus as claimed in claim 16, comprising in addition an indicating mechanism including an indicator slide member attached to one end of a flexible reelable transmission member, the other end of which is attached to the sleeve carrying the knife blade forming the shiftable fulcrum.

18. An autographic recording apparatus as claimed in claim 16, comprising in addition an indicator mechanism including an indicator slide member attached to one end of a flexible transmission member, the other end of which is attached to the sleeve carrying the knife blade forming the shiftable fulcrum, the said indicator slide member being provided with pointer arms, a further indicator including a rotatable cylinder provided with a plurality of graduations arranged in parallelism to the cylinder axis the rotatable cylinder being parallel to the axis of the indicator slide provided with arms, the arms moving along the graduations of the rotatable cylinder, the rotatable cylinder coupled with the means for shifting the movable member along the series of rotatable drums, and displaying graduations corresponding to the position of the shiftable member on the series of rotatable drums, the pointer arms thus indicating the total ratio of transmission between the machine the performance of which is recorded and the chart pulling mechanism.

19. An autographic recording apparatus as claimed in claim 16, wherein the gear transmission between the pinion rod and the first slide member includes a coupling member transmitting motion only in one direction, and means adapted to be driven manually for moving the first slide member and thereby also the second slide member and the pulley connected with the latter in order to return the chart pulling mechanism without disturbing the other mechanisms in engagement with the pinion rod.

References Cited in the file of this patent

UNITED STATES PATENTS

| | | |
|---|---|---|
| 1,379,916 | Gueugnon | May 31, 1921 |
| 2,326,219 | Hayward | Aug. 10, 1943 |
| 2,671,360 | Bade | Mar. 9, 1954 |
| 2,692,516 | O'Leary | Oct. 26, 1954 |